(12) United States Patent
Fujishiro et al.

(10) Patent No.: US 10,232,746 B2
(45) Date of Patent: Mar. 19, 2019

(54) VEHICLE SEAT

(71) Applicant: TOYOTA BOSHOKU KABUSHIKI KAISHA, Aichi (JP)

(72) Inventors: Shun Fujishiro, Aichi (JP); Shinya Isobe, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/806,856

(22) Filed: Nov. 8, 2017

(65) Prior Publication Data
US 2018/0141473 A1 May 24, 2018

(30) Foreign Application Priority Data

Nov. 21, 2016 (JP) .................... 2016-226046

(51) Int. Cl.
*B60N 2/20* (2006.01)
*B60N 2/22* (2006.01)
*B60N 2/235* (2006.01)

(52) U.S. Cl.
CPC ............. *B60N 2/2352* (2013.01); *B60N 2/20* (2013.01); *B60N 2/224* (2013.01)

(58) Field of Classification Search
CPC ......... B60N 2/20; B60N 2/224; B60N 2/2352
USPC ................................................. 297/366–369
See application file for complete search history.

(56) References Cited

U.S. PATENT DOCUMENTS

| 4,634,182 A | * | 1/1987 | Tanaka ................... | B60N 2/433 297/363 |
| 4,765,680 A | * | 8/1988 | Kawashima ......... | B60N 2/2352 297/367 |
| 4,765,681 A | * | 8/1988 | Houghtaling ........ | B60N 2/2352 297/367 R |
| 4,795,213 A | * | 1/1989 | Bell ..................... | B60N 2/2352 297/367 R |
| 4,822,100 A | * | 4/1989 | Bell ..................... | B60N 2/2352 297/366 |
| 4,836,608 A | * | 6/1989 | Sugiyama ............ | B60N 2/2352 297/367 |
| 4,872,726 A | * | 10/1989 | White .................. | B60N 2/2352 297/367 R |

(Continued)

FOREIGN PATENT DOCUMENTS

JP 2009-201783 9/2009

*Primary Examiner* — Rodney B White
(74) *Attorney, Agent, or Firm* — Greenblum & Bernstein, P.L.C.

(57) ABSTRACT

Provided is a vehicle seat capable of resisting a large load in a forward or rearward direction while reducing increase in size and weight. The vehicle seat comprises a cushion frame, a back frame, a tilting member arranged on a pivot axis of the back frame and configured to transmit to the back frame a pivoting force to pivot the back frame, an engagement member coupled to the back frame and displaceable between an engaged position in which engagement with the tilting member is made and an unengaged position in which the engagement is released, a locking member displaceable between a locking position to retain the engagement member in the engaged position and a non-locking position, and a stopper fixed to the back frame and capable of receiving, through the engagement member, an external force that acts on the engagement member located in the engaged position.

15 Claims, 7 Drawing Sheets

(56) References Cited

U.S. PATENT DOCUMENTS

| | | | | |
|---|---|---|---|---|
| 4,875,735 A * | 10/1989 | Moyer | ................ | B60N 2/2352 297/367 R |
| 5,138,744 A * | 8/1992 | Coggon | ............... | B60N 2/2352 297/367 |
| 5,154,476 A * | 10/1992 | Haider | ................ | B60N 2/2352 297/367 R |
| 5,205,609 A * | 4/1993 | Notta | ................ | B60N 2/2352 297/367 |
| 5,340,196 A * | 8/1994 | Ikegaya | ............... | B60N 2/2352 297/354.12 |
| 5,375,915 A * | 12/1994 | Harry | ................... | B60N 2/0292 297/354.12 |
| 5,393,116 A * | 2/1995 | Bolsworth | ........ | B60N 2/01583 297/367 |
| 5,433,507 A * | 7/1995 | Chang | ................ | B60N 2/2352 297/354.12 |
| 5,522,643 A * | 6/1996 | Matsuura | ............ | B60N 2/2354 297/367 R |
| 5,540,117 A * | 7/1996 | Hansel | .................... | B60N 2/20 297/367 R |
| 5,590,932 A * | 1/1997 | Olivieri | ............... | B60N 2/2352 297/354.12 |
| 5,690,386 A * | 11/1997 | Chabanne | .............. | B60N 2/688 297/367 R |
| 5,718,481 A * | 2/1998 | Robinson | ............ | B60N 2/2354 297/367 R |
| 5,733,008 A * | 3/1998 | Tame | ..................... | B60N 2/433 297/367 |
| 6,033,022 A * | 3/2000 | Bauer | ..................... | B60N 2/20 297/378.12 |
| 6,273,508 B1 * | 8/2001 | Lange | ................... | B60N 2/2352 297/366 |
| 6,926,362 B2 * | 8/2005 | Kroner | .................. | B60N 2/20 297/354.12 |
| 7,287,814 B2 * | 10/2007 | Heimann | ................ | B60N 2/20 297/367 |
| 7,328,954 B2 * | 2/2008 | Sasaki | ..................... | B60N 2/12 297/367 |
| 7,364,237 B2 * | 4/2008 | Grable | .................... | B60N 2/20 297/367 R |
| 7,490,907 B2 * | 2/2009 | Nagura | ................... | B60N 2/20 297/367 R |
| 7,648,206 B2 * | 1/2010 | Wieclawski | ............ | B60N 2/12 297/367 R |
| 8,109,573 B2 * | 2/2012 | Kienke | ................... | B60N 2/20 297/367 R |
| 8,186,759 B2 * | 5/2012 | Vedder | ................... | B60N 2/20 297/367 R |
| 8,783,775 B2 * | 7/2014 | Kienke | ................... | B60N 2/20 297/366 |
| 8,820,837 B2 * | 9/2014 | Kienke | ................... | B60N 2/2352 297/367 R |
| 2002/0008419 A1 * | 1/2002 | Boltze | .................. | B60N 2/2352 297/367 R |
| 2002/0050733 A1 * | 5/2002 | Hansel | ................... | B60N 2/206 297/367 R |
| 2002/0113479 A1 * | 8/2002 | Deptolla | ............. | B60N 2/2354 297/366 |
| 2002/0153755 A1 * | 10/2002 | Sugimoto | ............ | B60N 2/2352 297/367 R |
| 2003/0025375 A1 * | 2/2003 | Gray | ....................... | B60N 2/206 297/367 R |
| 2003/0042780 A1 * | 3/2003 | Klein | ....................... | B60N 2/20 297/367 R |
| 2003/0062755 A1 * | 4/2003 | Klein | ....................... | B60N 2/20 297/367 R |
| 2003/0127898 A1 * | 7/2003 | Niimi | ...................... | B60N 2/206 297/367 R |
| 2003/0160490 A1 * | 8/2003 | Nock | ................... | B60N 2/2352 297/367 R |
| 2004/0036339 A1 * | 2/2004 | Christoffel | ............... | B60N 2/20 297/367 R |
| 2004/0189072 A1 * | 9/2004 | Chiu | ....................... | B60N 2/206 297/367 R |
| 2004/0245816 A1 * | 12/2004 | Nock | ................... | B60N 2/2352 297/367 |
| 2005/0116521 A1 * | 6/2005 | Chabanne | ............ | B60N 2/2352 297/366 |
| 2005/0248197 A1 * | 11/2005 | Hofmann | ................ | B60N 2/20 297/367 R |
| 2005/0264075 A1 * | 12/2005 | Hofmann | ................ | B60N 2/20 297/367 R |
| 2006/0170268 A1 * | 8/2006 | Nock | ....................... | B60N 2/20 297/366 |
| 2006/0181131 A1 * | 8/2006 | Kienke | ............... | B60N 2/2352 297/367 R |
| 2006/0226687 A1 * | 10/2006 | Leconte | ................. | B60N 2/235 297/367 R |
| 2006/0250012 A1 * | 11/2006 | Becker | ..................... | B60N 2/12 297/366 |
| 2006/0267391 A1 * | 11/2006 | Becker | ..................... | B60N 2/20 297/366 |
| 2007/0170764 A1 * | 7/2007 | Thiel | ...................... | B60N 2/2252 297/367 R |
| 2008/0030061 A1 * | 2/2008 | Pejathaya | ............. | B60N 2/856 297/367 R |
| 2008/0122281 A1 * | 5/2008 | Weber | ..................... | B60N 2/20 297/366 |
| 2009/0108657 A1 * | 4/2009 | Becker | ................... | B60N 2/206 297/367 R |
| 2009/0218870 A1 | 9/2009 | Kawamura et al. | | |
| 2009/0243362 A1 * | 10/2009 | Wieclawski | ......... | B60N 2/2358 297/366 |
| 2009/0284063 A1 * | 11/2009 | Quast | ................... | B60N 2/2352 297/366 |
| 2010/0026069 A1 * | 2/2010 | Bruck | ....................... | B60N 2/20 297/367 |
| 2010/0096897 A1 * | 4/2010 | Kienke | ................... | B60N 2/2352 297/367 R |
| 2010/0141007 A1 * | 6/2010 | Kienke | ................... | B60N 2/206 297/367 R |
| 2010/0171351 A1 * | 7/2010 | Thiel | ....................... | B60N 2/20 297/367 |
| 2010/0283304 A1 * | 11/2010 | Thiel | ..................... | B60N 2/206 297/367 R |
| 2013/0234489 A1 * | 9/2013 | Lehmann | ................ | B60N 2/12 297/366 |
| 2014/0138998 A1 * | 5/2014 | Christoffel | ........... | B60N 2/2358 297/367 R |

\* cited by examiner

VEHICLE SEAT

CROSS-REFERENCE TO RELATED APPLICATIONS

This application claims the benefit of Japanese Patent Application No. 2016-226046 filed on Nov. 21, 2016 with the Japan Patent Office, the entire disclosure of which is incorporated herein by reference.

BACKGROUND

The present disclosure relates to a vehicle seat for use in vehicles, such as automobiles, railway vehicles, ships, and airplanes.

For example, Japanese Unexamined Patent Application Publication No. 2009-201783 describes a vehicle seat in which releasing engagement of a pawl with a ratchet plate allows a seatback to be folded down toward a seat front side (or in a front direction). "Being folded down" means forward tilting of the seatback greater than ordinary forward tilting of the seatback by reclining.

A "folding down" function is intended to achieve a function (for example, a "walk-in function") or the like that improves accessibility to an area rearward of a door-side second-row seat of a minivan having three-row seats, a front passenger seat of a passenger car, or the like.

SUMMARY

When a large load in a front (forward) or rear (rearward) direction is applied to a seatback, a stress may be concentrated on engaged parts of the pawl and the ratchet plate (in particular, on the pawl), thereby resulting in disengagement.

A possible solution to this problem may be to increase respective thicknesses of the pawl and the ratchet plate. However, such solution will lead to increase in size and weight of the pawl and the ratchet plate.

In one aspect of the present disclosure, it is preferable that a vehicle seat be capable of resisting a large load in a forward or rearward direction while reducing increase in size and weight.

One aspect of the present disclosure is a vehicle seat provided with a seat cushion and a seatback pivotable in forward and rearward directions relative to the seat cushion. The vehicle seat comprises a cushion frame forming a framework of the seat cushion; a back frame forming a framework of the seatback and coupled to the cushion frame pivotably in the forward and rearward directions; a tilting member arranged on a pivot axis of the back frame and configured to transmit to the back frame a pivoting force to pivot the back frame; an engagement member coupled to the back frame and displaceable between an engaged position and an unengaged position, the engaged position being a position in which the engagement member is engaged with the tilting member, and the unengaged position being a position in which the engagement member is released from engagement; a locking member displaceable between a locking position to retain the engagement member in the engaged position and a non-locking position; and a stopper fixed to the back frame and capable of receiving, through the engagement member, an external force that acts on the engagement member located in the engaged position. The tilting member is pivotable relative to the back frame. The engagement member allows transmission of the pivoting force to the back frame when the engagement member is located in the engaged position.

With the configuration described above, when the tilting member and the engagement member are in an engaged state, the back frame and the tilting member pivot together. That is, in such state, pivoting force can be transmitted from the tilting member to the back frame, and pivoting of the tilting member results in pivoting of the back frame and thus of the seatback.

When engagement between the tilting member and the engagement member is released, the back frame is freely pivotable without being restricted by the tilting member, and thus, for example, is capable of being "folded down."

If a large load in the forward or rearward direction is applied to the back frame when the tilting member and the engagement member are in the engaged state, then the load acts on engaged parts between the tilting member and the engagement member and on the stopper in a distributed manner.

Accordingly, a load received by the engaged parts can be reduced as compared with a configuration (for example, the configuration disclosed in the aforementioned Publication) in which a load is received by only the engaged parts. Thus, it is possible to obtain a vehicle seat capable of resisting a large load in a forward or rearward direction, while reducing increase in size and weight of the tilting member and engagement member The present disclosure may comprise the following configurations.

The tilting member may comprise an abutment portion configured to abut the stopper when the back frame pivots in the rearward direction. When the engagement member is located in the engaged position, the engagement member may be positioned forward of the stopper, and the abutment portion may be positioned rearward of the stopper.

This avoids the need to separately provide a regulation part to regulate excessive pivotal displacement of the back frame in the rearward direction, and thus may reduce complexity of configurations around the tilting member.

In a case where no external force acts on the engagement member when the engagement member is located in the engaged position, the stopper and the engagement member may be separated from each other. This enables secure engagement between the tilting member and the engagement member.

Specifically, if the stopper and the engagement member have respective nominal values such that the stopper and the engagement member may contact each other, then sufficient engagement of the tilting member and the engagement member might not be achieved when dimensions of the stopper and the engagement member are respective upper limit values within respective tolerance ranges of their respective nominal values.

In contrast, if no external force acts on the engagement member when the engagement member is located in the engaged position, then the stopper and the engagement member are separated from each other, allowing absorption of the aforementioned dimensional variations to thereby achieve secure engagement of the tilting member and the engagement member.

The back frame may comprise a first side frame and a second side frame positioned separately from each other in a seat width direction. The engagement member may be provided to the first side frame. A restriction member may be provided on an opposite side of the engagement member relative to the first side frame, the restriction member being configured to restrict the engagement member from being displaced in the seat width direction. Also, the restriction member may be fixed to the first side frame at a plurality of places, and at least one place of the plurality of places is fixed to the first side frame through the stopper.

This enables securely retaining the engaged state between the tilting member and the engagement member and enables firm retention of the stopper.

Specifically, the stopper is fixed to the side frame and the restriction member in a state of being held between the side frame and the restriction member. In other words, the stopper may have both ends fixed to, or held by, the side frame and the restriction member. Accordingly, the stopper can be firmly retained.

The present disclosure may comprise an inclined guide surface provided in a portion of the stopper facing the engagement member or in a portion of the engagement member facing the stopper. The inclined guide surface may exert a force on the engagement member to displace the engagement member toward the engaged position when the engagement member contacts the stopper due to the external force.

Then, even if a large load in the forward or rearward direction is applied, it may be possible to use the load to achieve a more secure engagement between the tilting member and the engagement member.

BRIEF DESCRIPTION OF THE DRAWINGS

Some embodiments of the present disclosure will be described hereinafter by way of example with reference to the accompanying drawings, in which.

DETAILED DESCRIPTION OF THE PREFERRED EMBODIMENTS

Figure 1:
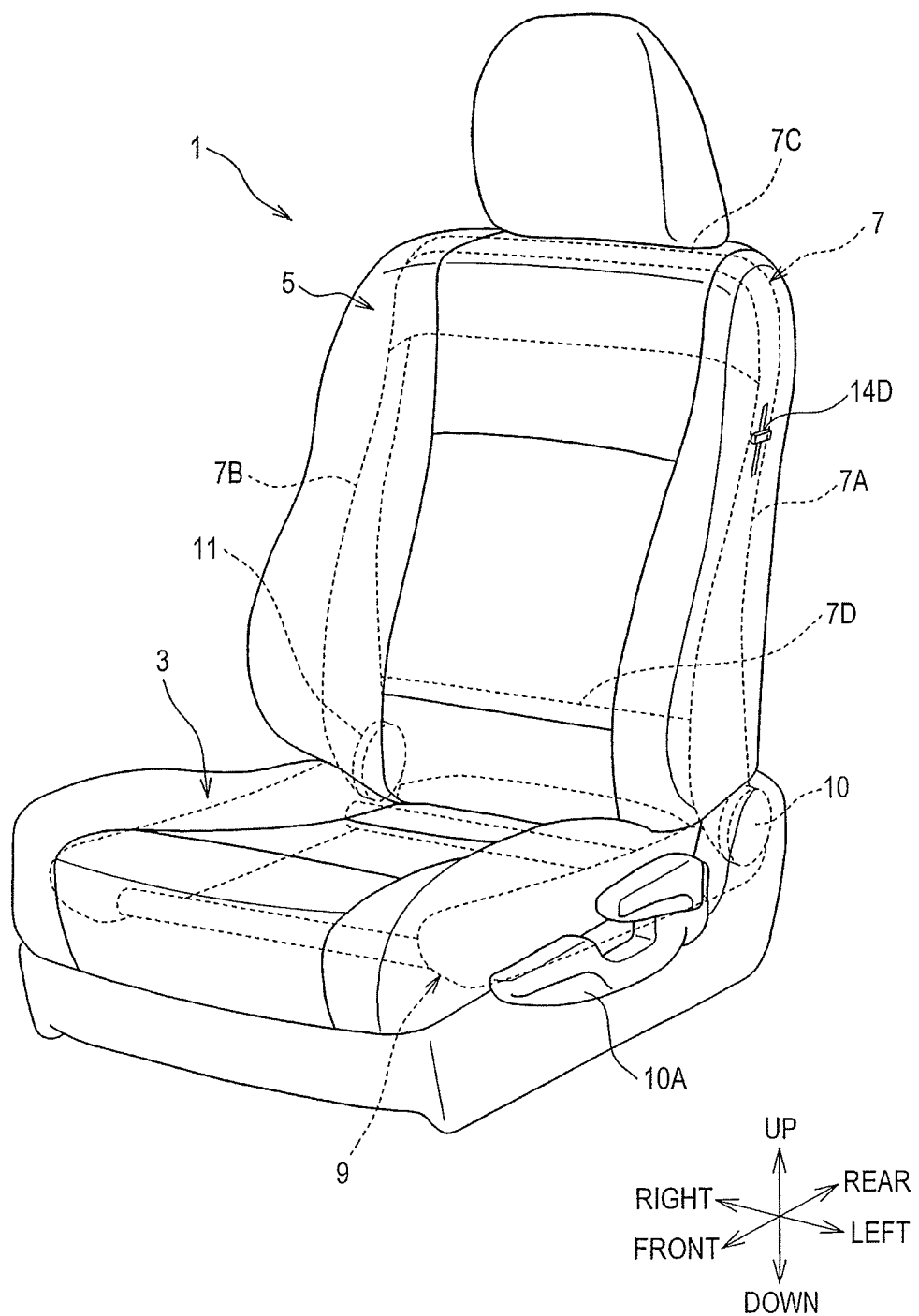
FIG. 1 is an external perspective view of a vehicle seat of the embodiments.

"Embodiments" described hereinafter are example embodiments within the technical scope of the present disclosure. In other words, matters specifying the invention defined by the accompanying claims are not limited to specific configurations, structures, and the like, described in the embodiments herein.

Arrows and other marks indicating directions shown in the figures are provided for the purpose of easy understanding of mutual relationships of the figures, and the arrows (directions) shown in the figures are not to limit the scope of the present disclosure.

At least a member or portion described with a reference numeral is provided at least one in number unless there is a specifying term, such as "only one." In other words, two or more members may be provided unless there is a specifying term, such as "only one."

First Embodiment

The present embodiment describes a front seat of a passenger car. Directions in the description hereinafter mean respective directions in a state where a vehicle seat of the present embodiment is assembled to a vehicle.

1. Overview of Vehicle Seat

As shown in FIG. 1, a vehicle seat 1 at least comprises a seat cushion 3 and a seatback 5. The seat cushion 3 is a portion to support an occupant's hip and other regions. The seatback 5 is a portion to support an occupant's back, and is pivotable with respect to the seat cushion 3 in forward and rearward directions.

The seatback 5 of the present embodiment can be folded down in the forward direction. The term "folded down" means a state where the seatback 5 is tilted greatly in the forward direction, compared with tilting of a seatback by ordinary reclining.

A back frame 7 is a frame that configures a framework of the seatback 5, and is pivotably coupled to a cushion frame 9. The cushion frame 9 is a frame that configures a framework of the seat cushion 3.

The back frame 7 comprises two side frames 7A, 7B, an upper panel 7C, and a lower panel 7D. The side frames 7A, 7B extend in substantially up and down directions, and are arranged at both sides of the back frame 7 in a seat width direction. The seat width direction in the present embodiment coincides with a right-left direction of the vehicle.

The upper panel 7C extends in the seat width direction, and couples respective upper ends of the side frames 7A, 7B. The upper panel 7C is an open sectional panel-shaped frame having a generally C-shaped section perpendicular to an extending direction of the upper panel 7C.

The lower panel 7D extends in the seat width direction, and couples respective lower ends of the side frames 7A, 7B. The lower panel 7D is an open sectional panel-shaped member having a generally C-shaped or J-shaped section perpendicular to an extending direction of the lower panel 7D.

Recliners 10, 11 are provided on both sides of the back frame 7 in the seat width direction, that is, to the respective side frames 7A, 7B. The two recliners 10, 11 are a mechanism to achieve a function (hereinafter, referred to as a "reclining function") to restrict pivoting (reclining) of the seatback 5, and thus of the back frame 7, and also a mechanism to achieve a folding down function.

2. Configuration of Recliner

The recliner 10 and the recliner 11 have the same configuration except in that the recliner 10 and the recliner 11 are symmetrical to each other. Hereinafter, the configuration of these recliners will be described taking the recliner 10 (located to the left in the present embodiment) as an example.

<Reclining Function>

The reclining function is achieved by a locking mechanism (not shown) and a pivoting force generation mechanism (not shown). The locking mechanism is a mechanism to switch between a locked state in which pivoting of the back frame 7 is restricted and a released state in which the locked state is released.

The pivoting force generation mechanism is a mechanism that generates a pivoting force to pivot the back frame 7 at least in the released state. The pivoting force generation mechanism generates the pivoting force by using an electric motor or a spiral spring (a torsion coil spring).

In the present embodiment, the pivoting force is generated by an elastic force of a spiral spring. The pivoting force by the elastic force causes a force of tilting the back frame 7 in the forward direction to be always acted on the back frame 7.

Accordingly, when a reclining lever 10A is operated to bring the locking mechanism into the released state, the back frame 7 tends to be tilted in the forward direction by the pivoting force. In the released state, if the occupant presses the seatback 5 in the rearward direction against the pivoting force, then the seatback 5 pivots in the rearward direction.

In a case where the pivoting force generation mechanism is configured with an electric motor, the electric motor rotates clockwise or counter-clockwise at a time when the locking mechanism is brought into the released state, thereby to pivot the seatback 5 in the forward or rearward direction.

<Folding Down Function>

Figure 2:
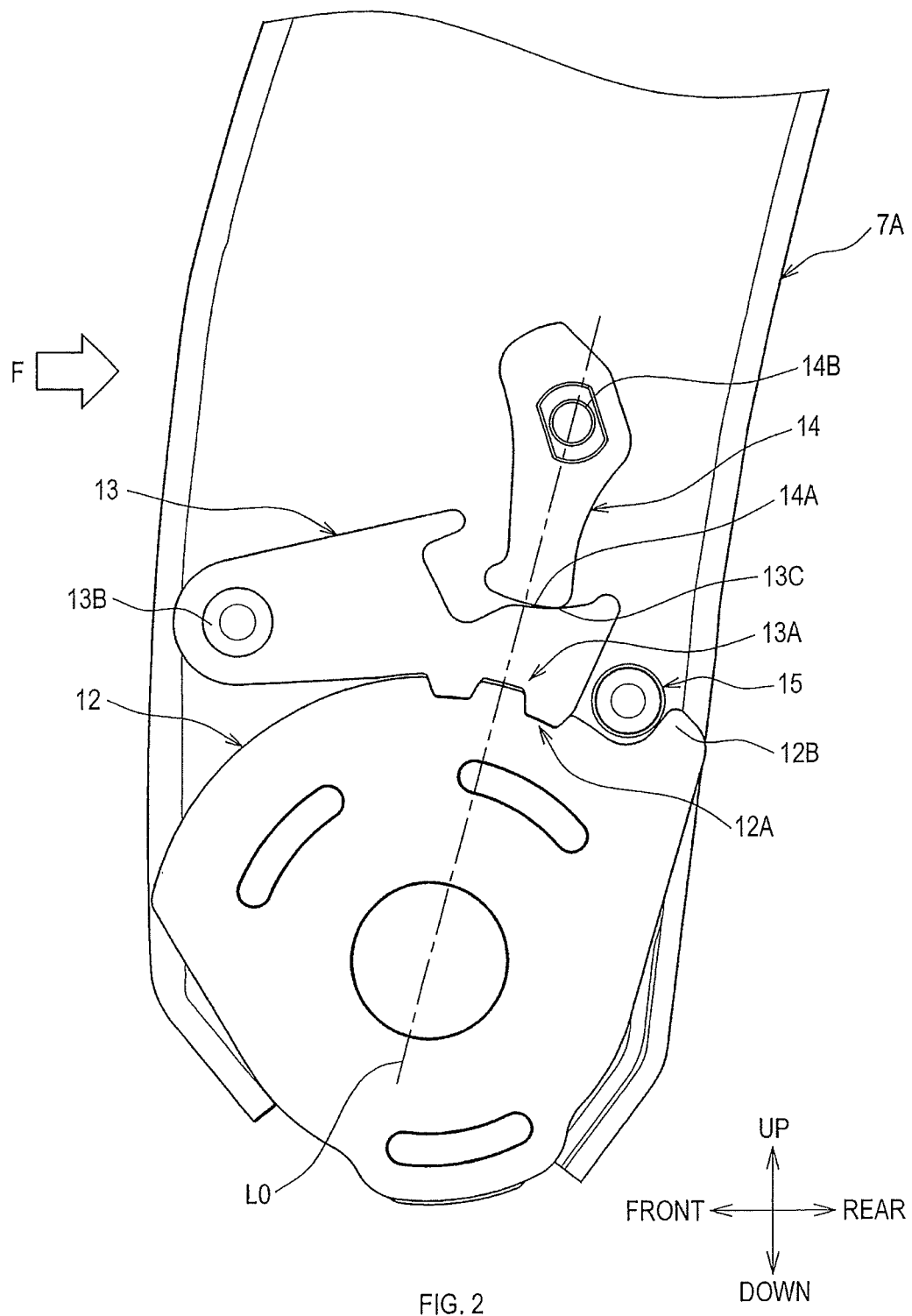
FIG. 2 is a view showing a feature of a recliner of a first embodiment.

As shown in FIG. 2, a folding down function is achieved by employing at least a tilting member 12, an engagement member 13, and a locking member 14. The tilting member 12 is a member that is arranged on the same axis as a pivot axis of the back frame 7 (the side frame 7A in the present embodiment) to transmit the pivoting force to the side frame 7A. The tilting member 12 is commonly also referred to as a ratchet plate or a rotation cam.

The tilting member 12 is coupled to the side frame 7A so as to be pivotable relative to the side frame 7A. In other words, the tilting member 12 and the side frame 7A (the back frame 7) are pivotable relative to the cushion frame 9 independently of each other.

Figure 3:
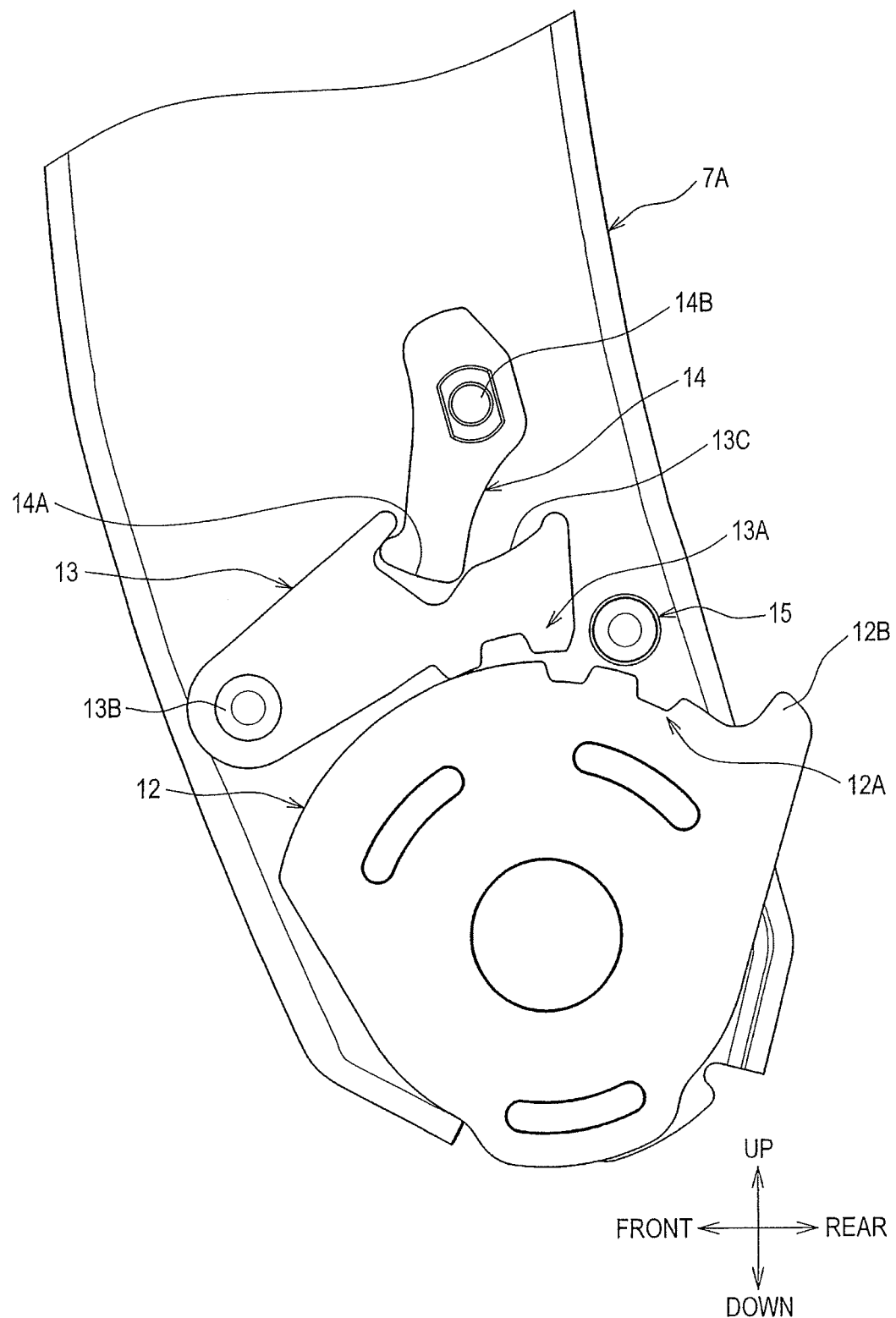
FIG. 3 is a view showing a feature of the recliner of the first embodiment.

The engagement member 13 is displaceably coupled to the back frame 7 (the side frame 7A in the present embodiment), and is displaceable between an engaged position (see FIG. 2) at which an engagement with the tilting member 12 is established and an unengaged position (see FIG. 3) at which the engagement is released. The engagement member 13 is commonly also referred to as a "pawl."

Specifically, above the tilting member 12, the engagement member 13 extends in the forward and rearward directions along the plate surface of the side frame 7A. A forward portion of the engagement member 13 is pivotably coupled to the side frame 7A using a coupling pin 13B.

A rearward portion of the engagement member 13 comprises an engagement portion 13A to engage with an engagement target portion 12A provided to the tilting member 12. The engagement target portion 12A and the engagement portion 13A each have concave and convex shapes, and the engagement target portion 12A and the engagement portion 13A are engaged when the engagement target portion 12A and the engagement portion 13A fit in each other in an engaging manner.

When the engagement target portion 12A and the engagement portion 13A are engaged with each other, the pivoting force transmitted to the tilting member 12 is allowed to be transmitted to the side frame 7A. Thus, if the locking mechanism is brought into the released state when the engagement member 13 is in the engaged position, then the tilting member 12 and the back frame 7 pivot, as a single member, relative to the cushion frame 9.

When the engagement target portion 12A and the engagement portion 13A are not engaged with each other, the pivoting force cannot be transmitted to the side frame 7A, and the side frame 7A is pivotable relative to the tilting member 12. Thus, when the engagement member 13 is in the unengaged position, the side frame 7A is pivotable (or can be folded down) relative to the cushion frame 9 even if the locking mechanism is in the locked state.

The locking member 14 is a member that is displaceable between a locking position to hold the engagement member 13 in the engaged position and a position other than the locking position (hereinafter referred to as a "non-locking position"). The locking member 14 of the present embodiment extends above the engagement portion 13A in substantially up and down directions along the plate surface of the side frame 7A.

The locking member 14 is pivotably coupled to the side frame 7A through a coupling pin 14B in an upper end part of the locking member 14. The locking member 14 comprises a lower end part having a cam portion 14A that slidingly contacts a sliding contact portion 13C of the engagement member 13.

As shown in FIG. 2, when the locking member 14 is in the locking position, an extending direction of the locking member 14 is substantially parallel to a virtual line L0. The virtual line L0 passes through a pivot center of the locking member 14 and a pivot center of the tilting member 12.

Figure 4:
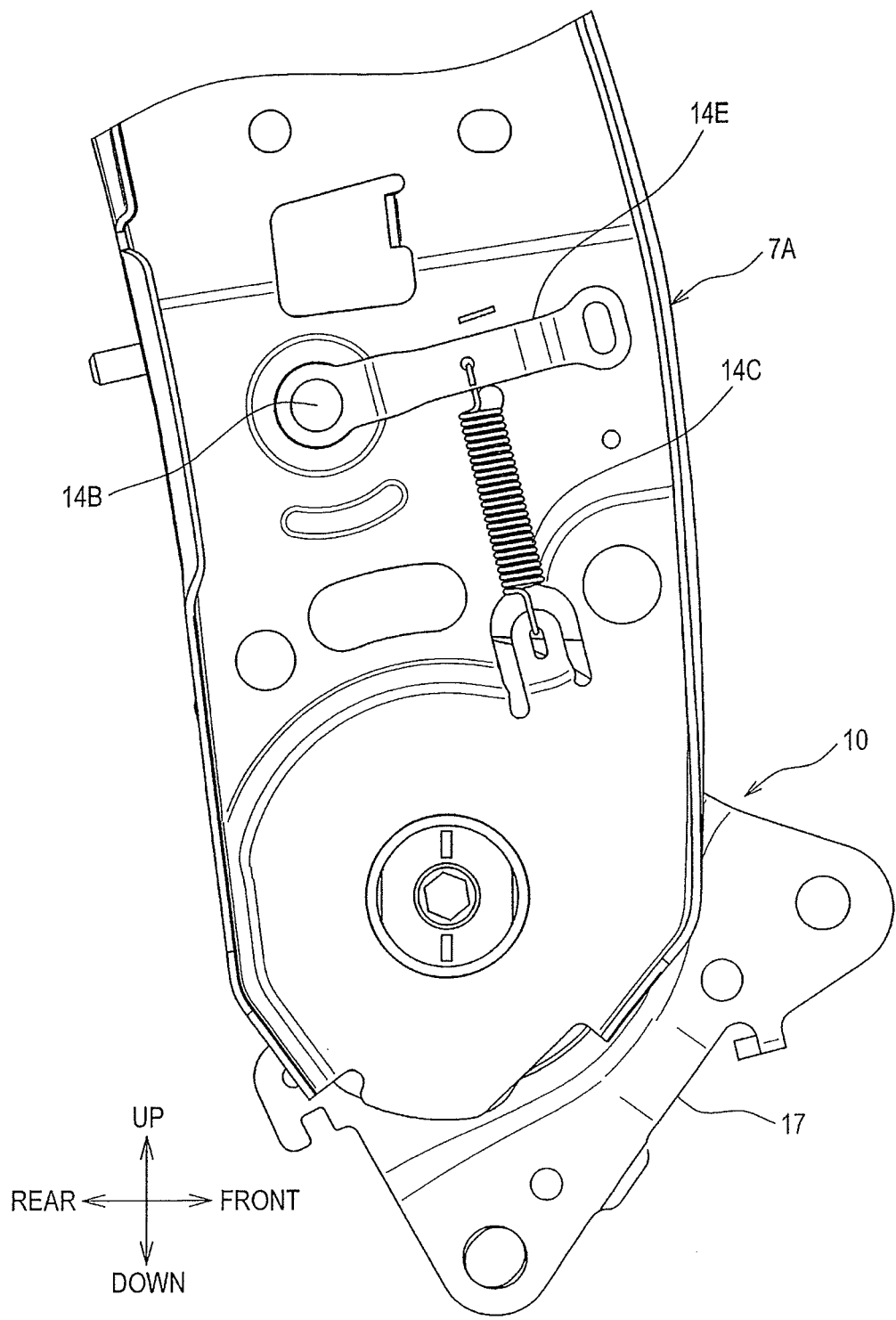
FIG. 4 is a view showing a reverse side of FIG. 2.

As shown in FIG. 4, a spring 14C and an arm 14E are provided opposite to the locking member 14 with the side frame 7A located therebetween, that is, on a part of the side frame 7A facing the side frame 7B.

The spring 14C exhibits an elastic force to hold the locking member 14 in the locking position through the arm 14E. The arm 14E comprises an end to which one end of a wire, such as a control cable, is coupled.

The other end of the wire is coupled to a walk-in lever 14D (see FIG. 1). Thus, an occupant can displace the locking member 14 toward the non-locking position by operating the walk-in lever 14D.

The recliner 10 comprises a spring (not shown) to hold the engagement member 13 in the unengaged position. Thus, when the locking member 14 is displaced to the non-locking position, an elastic force of the spring causes the engagement member 13 to be displaced toward the unengaged position. Then, when the locking member 14 returns from the non-locking position to the locking position, the locking member 14 causes the engagement member 13 to be displaced from the unengaged position to the engaged position.

A stopper 15 shown in FIG. 2 is fixed to the back frame 7 (the side frame 7A in the present embodiment) and is capable of receiving, through the engagement member 13, an external force F that acts on the engagement member 13 located in the engaged position. The stopper 15 is a columnar or cylindrical pin member. However, the stopper 15 may have, for example, a fan-shaped section.

Specifically, the external force F is a force that acts on the engagement member 13 through the seatback 5 (the back frame 7) and is directed rearward from the front of the seat. The stopper 15 is arranged rearward of the engagement member 13 located in the engaged position.

If no external force F acts on the engagement member 13 when the engagement member 13 is located in the engaged position, the stopper 15 and the engagement member 13 are separated by a gap or an elastic member, such as rubber.

The tilting member 12 comprises an abutment portion 12B provided rearward of the stopper 15. The abutment portion 12B abuts the stopper 15 when the back frame 7 pivots in the rearward direction.

Specifically, when the engagement member 13 is located in the unengaged position, the back frame 7 is pivotable in the forward and rearward directions relative to the tilting member 12. The abutment portion 12B restricts the back frame 7 in a pivotable state so as not to allow the back frame 7 to pivot beyond a specified state in the rearward direction relative to the tilting member 12.

When the engagement member 13 is located in the engaged position, the engagement member 13 is located forward of the stopper 15, and the abutment portion 12B is located rearward of the stopper 15. That is, the stopper 15 is located between the engagement member 13 and the abutment portion 12B in a front-rear direction.

Figure 5:
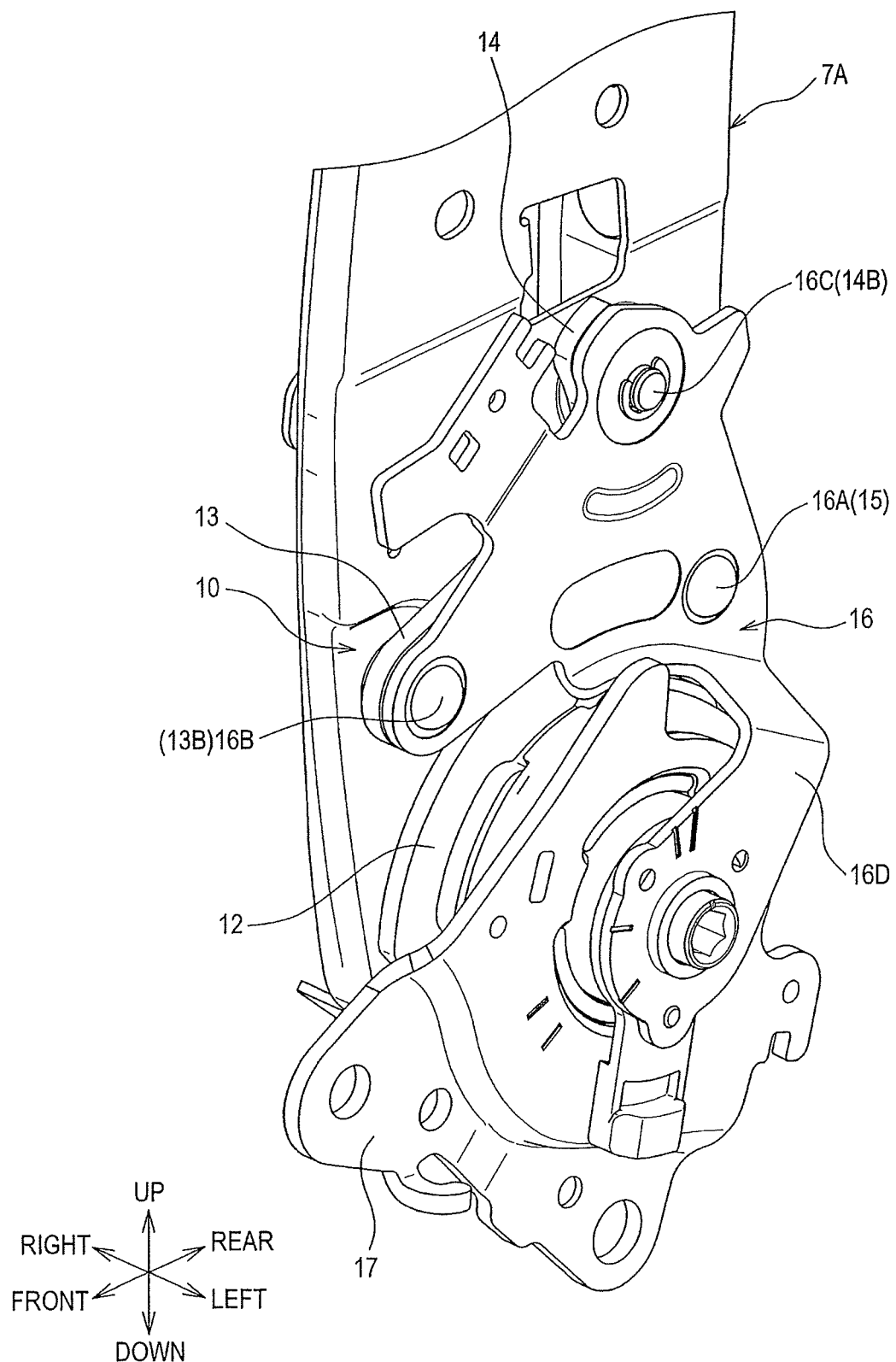
FIG. 5 is an external perspective view of the recliner of the first embodiment.

As shown in FIG. 5, a restriction member 16 is provided on an opposite side of the engagement member 13 relative to the side frame 7A. The restriction member 16, which is one example of a cover that covers the locking member 14 and the engagement member 13, restricts displacement of the locking member 14 and the engagement member 13 in the seat width direction.

Specifically, the side frame 7A is located rightward of the locking member 14 and the engagement member 13 in the seat width direction and the restriction member 16 is located leftward of the locking member 14 and the engagement member 13 in the seat width direction. Accordingly, the locking member 14 and the engagement member 13 are held by the side frame 7A and the restriction member 16 in the seat width direction and restricted from displacement in the seat width direction.

The restriction member 16 is fixed to the side frame 7A at a plurality of places (at least a first fixing portion 16A to a third fixing portion 16C in the present embodiment). The first fixing portion 16A is fixed to the side frame 7A through the stopper 15.

The second fixing portion 16B is fixed to the side frame 7A through the coupling pin 13B. The first fixing portion 16A and the second fixing portion 16B are fixed by caulking to the stopper 15 and the coupling pin 13B, respectively.

The third fixing portion 16C is fixed to the side frame 7A through the coupling pin 14B. The third fixing portion 16C is fixed to the coupling pin 14B with a snap ring, such as an E-type snap ring.

The restriction member 16 comprises an arm 16D extending toward the pivot axis of the tilting member 12. A bracket 17 in FIG. 5 is a member to couple the back frame 7, including the recliner 10, to the cushion frame 9.

3. Features of Vehicle Seat (Particularly, Recliner) of Present Embodiment

In the present embodiment, when the tilting member 12 and the engagement member 13 are in an engaged state, the back frame 7 and the tilting member 12 pivot together. Specifically, in the engaged state, since the pivoting force can be transmitted from the tilting member 12 to the back frame 7, pivoting of the tilting member 12 causes pivoting of the back frame 7 and, thus, of the seatback.

When the tilting member 12 and the engagement member 13 are in an unengaged state, the back frame 7 is freely pivotable without being restricted by the tilting member 12, and therefore can be "folded down."

Figure 6:
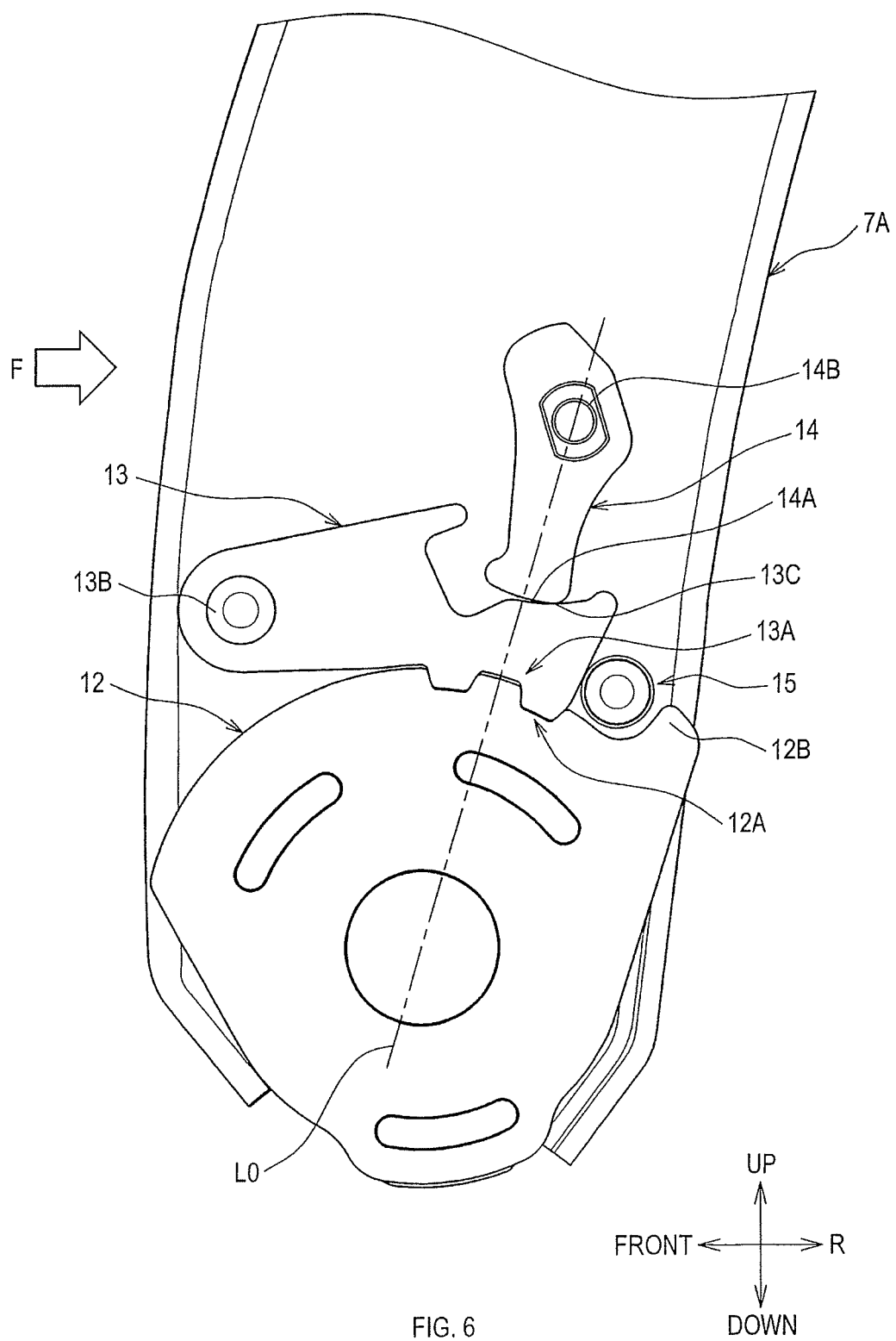
FIG. 6 is an explanatory view showing a feature of the recliner of the first embodiment.

If a large load, for example, in the rearward direction is applied to the back frame 7 when the tilting member 12 and the engagement member 13 are in the engaged state, the engagement member 13 contacts the stopper 15 as shown in FIG. 6, and the external force F due to the load acts on engaged parts between the tilting member 12 and the engagement member 13 and on the stopper 15 in a distributed manner.

Accordingly, as compared with a configuration in which the load is received by only the engaged parts between the tilting member 12 and the engagement member 13, the load to be received by the engaged parts can be reduced. Thus, it may be possible to achieve a vehicle seat that can withstand a large load in the rearward direction and, at the same time, reduce increase in size and weight of the tilting member 12 and the engagement member 13.

The tilting member 12 comprises the abutment portion 12B that abuts the stopper 15 when the back frame 7 pivots in the rearward direction. When the engagement member 13 is in the engaged position, the stopper 15 is located between the engagement member 13 and the abutment portion 12B in the front-rear direction.

This avoids the need to separately provide a regulation part to regulate excessive pivotal movement of the back frame 7 in the rearward direction, and may reduce complexity of configurations around the tilting member 12.

If no external force F acts on the engagement member 13 when the engagement member 13 is located in the engaged position, the stopper 15 and the engagement member 13 are separated from each other. This enables secure engagement between the tilting member 12 and the engagement member 13.

Specifically, if the stopper 15 and the engagement member 13 have respective nominal values such that the stopper 15 and the engagement member 13 may contact each other, then sufficient engagement of the tilting member 12 and the engagement member might not be achieved when dimensions of the stopper 15 and the engagement member 13 are respective upper limit values within respective tolerance ranges of their respective nominal values.

In contrast, in the present embodiment, if no external force F acts on the engagement member 13 when the engagement member 13 is located in the engaged position, the stopper 15 and the engagement member 13 are separated from each other, and thus the aforementioned dimensional variations can be absorbed to achieve secure engagement between the tilting member 12 and the engagement member 13.

The restriction member 16 restricts displacement of the engagement member 13 in the seat width direction. Specifically, the restriction member 16 "sandwiches" the locking member 14, the engagement member 13, and the tilting member 12 against side frame 7A. This securely retains the tilting member 12 and the engagement member 13 in the engaged state by preventing the engagement member 13 from slipping off of the tilting member 12 by slightly shifting or twisting.

Further, the restriction member 16 is fixed to the side frame 7A at the plurality of places, and one place (the first fixing portion 16A) among the plurality of places is fixed to the side frame 7A through the stopper 15.

As a result, the stopper 15 is fixed to the side frame 7A and the restriction member 16 in a state of being held between the side frame 7A and the restriction member 16. In other words, the stopper 15 may have both ends fixed to, or held by, the side frame 7A and the restriction member 16 respectively. Accordingly, the stopper 15 can be firmly retained.

Second Embodiment

The same elements as those in the first embodiment are assigned the same reference numerals, and descriptions thereof will not be repeated here.

Figure 7:
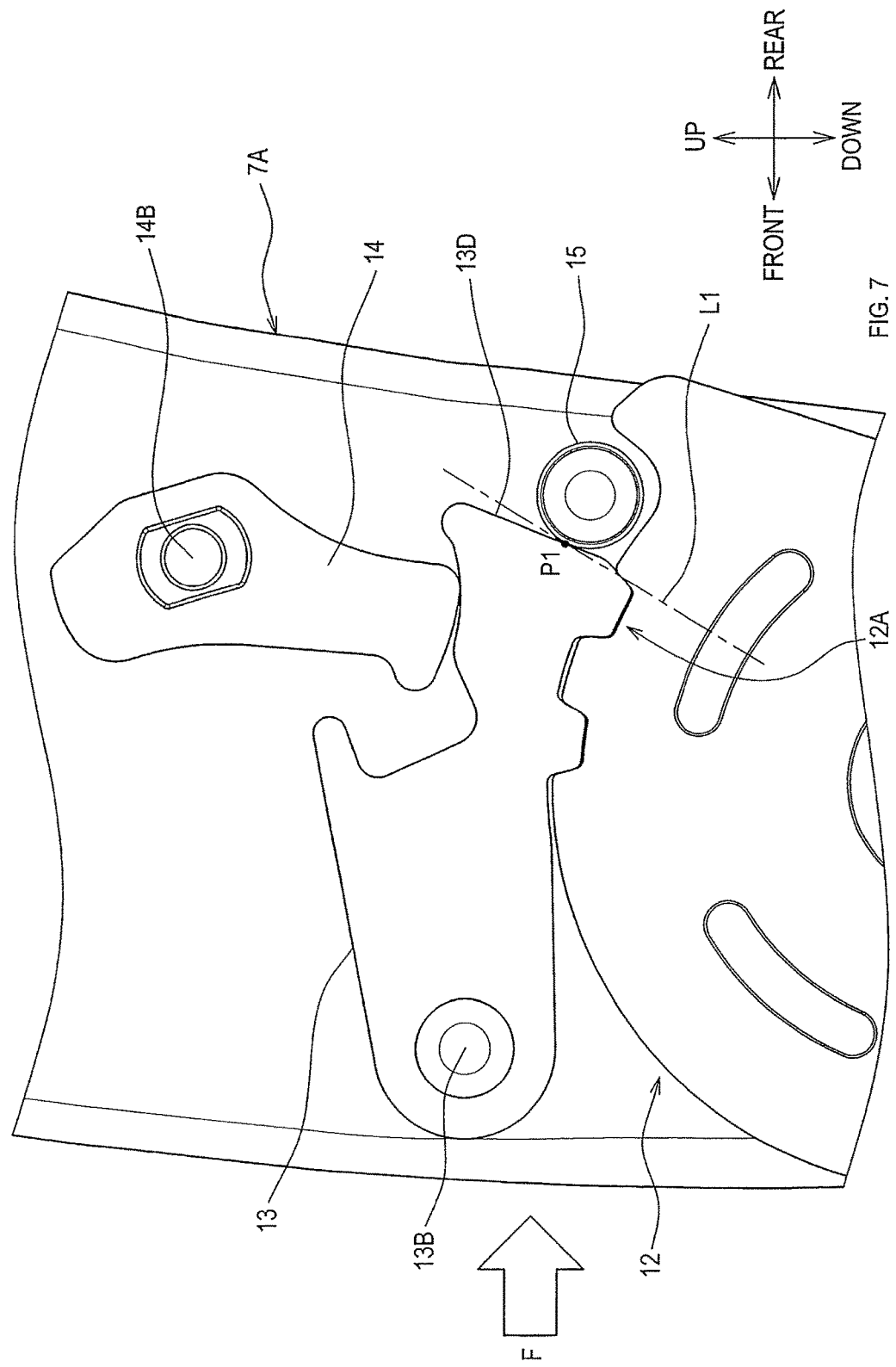
FIG. 7 is a view showing a feature of a recliner of a second embodiment.

As shown in FIG. 7, in the present embodiment, the engagement member 13 comprises an inclined guide surface 13D provided in a portion facing the stopper 15, that is, a portion to contact the stopper 15 when an external force F is acted.

The inclined guide surface 13D is an inclined surface configured to, when the engagement member 13 contacts the stopper 15 due to an external force, exert a downward force on the engagement member 13 to displace the engagement member 13 toward the engaged position, that is, toward the tilting member 12.

Specifically, the inclined guide surface 13D is inclined relative to a virtual line L1 that passes a contact point P1 between the engagement member 13 and the stopper 15 and the pivot axis of the tilting member 12 such that the inclined guide surface 13D comprises a part closer to the tilting member 12 (the engagement target portion 12A) than the contact point P1, and the part is positioned closer to the stopper 15 than the virtual line L1.

Thus, if a substantially large external force F acts on the back frame 7 when the tilting member 12 and the engagement member 13 are in the engaged state, and the stopper 15 contacts the inclined guide surface 13D of the engagement member 13, the engagement member 13 receives from the stopper 15 a reaction force including a force (a force component) toward the engagement target portion 12A.

Accordingly, it is possible to reduce displacement of the engagement member 13 toward the unengaged position when the engagement portion 13A is pressed toward the engagement target portion 12A. Then, even if a large load in the forward or rearward direction is applied, it is possible to use the load to achieve a more secure engagement between the tilting member 12 and the engagement member 13.

Other Embodiments

For example, it may be possible to employ (a) a configuration in which the abutment portion 12B is eliminated or (b) a configuration in which the abutment portion 12B is provided to a member other than the tilting member 12.

If no external force F acts when the engagement member 13 is located in the engaged position, the stopper 15 and the engagement member 13 may, for example, constantly contact each other at no contact surface pressure or a relatively small contact surface pressure.

The restriction member 16 of the present disclosure may be omitted. Alternatively, the restriction member 16 may be fixed to the side frame 7A at a position other than the stopper 15.

Further, it may be possible to employ, for example, (a) a configuration in which the inclined guide surface 13D is provided to the stopper 15 or (b) a configuration in which the inclined guide surface 13D is provided to each of the stopper 15 and the engagement member 13.

The aforementioned embodiments describe a front seat of a passenger car. However, the present disclosure is not limited to this, but may be applicable to seats for other automobiles or seats for use in other vehicles, such as railway vehicles, ships, and airplanes.

Furthermore, the present disclosure is not limited to the aforementioned embodiments, but may be embodied in various forms within the scope of the invention defined by the appended claims. Accordingly, it may be possible to employ a configuration obtained by combining at least two embodiments among the aforementioned embodiments, a configuration resistant to an external force directed forward from the rear of the seat by reversing the front and the rear of the configuration of the seat, and other configurations.

What is claimed is:

1. A vehicle seat provided with a seat cushion and a seatback, the seatback being pivotable in forward and rearward directions relative to the seat cushion, the vehicle seat comprising:
   a cushion frame forming a framework of the seat cushion;
   a back frame forming a framework of the seatback and coupled to the cushion frame pivotably in the forward and rearward directions;
   a tilting member arranged on a pivot axis of the back frame and configured to transmit to the back frame a pivoting force to pivot the back frame, the tilting member being pivotable relative to the back frame;
   an engagement member coupled to the back frame and displaceable between an engaged position and an unengaged position, the engaged position being a position in which the engagement member is engaged with the tilting member, and the unengaged position being a position in which the engagement member is released from engagement, the engagement member allowing transmission of the pivoting force to the back frame when the engagement member is located in the engaged position;
   a locking member displaceable between a locking position to retain the engagement member in the engaged position and a non-locking position; and
   a stopper fixed to the back frame and capable of receiving, through the engagement member, an external force that acts on the engagement member located in the engaged position,
   wherein a pivot center axis of the engagement member is positioned closer to a seat front side than a pivot center axis of the tilting member when the engagement member is located in the engaged position.

2. The vehicle seat according to claim 1,
   wherein the tilting member comprises an abutment portion configured to abut the stopper when the back frame pivots in the rearward direction, and
   wherein when the engagement member is located in the engaged position, the engagement member is positioned forward of the stopper, and the abutment portion is positioned rearward of the stopper.

3. A vehicle seat provided with a seat cushion and a seatback, the seatback being pivotable in forward and rearward directions relative to the seat cushion, the vehicle seat comprising:
   a cushion frame forming a framework of the seat cushion;
   a back frame forming a framework of the seatback and coupled to the cushion frame pivotably in the forward and rearward directions;
   a tilting member arranged on a pivot axis of the back frame and configured to transmit to the back frame a pivoting force to pivot the back frame, the tilting member being pivotable relative to the back frame;
   an engagement member coupled to the back frame and displaceable between an engaged position and an unengaged position, the engaged position being a position in which the engagement member is engaged with the tilting member, and the unengaged position being a position in which the engagement member is released from engagement, the engagement member allowing transmission of the pivoting force to the back frame when the engagement member is located in the engaged position;
   a locking member displaceable between a locking position to retain the engagement member in the engaged position and a non-locking position; and
   a stopper fixed to the back frame and capable of receiving, through the engagement member, an external force that acts on the engagement member located in the engaged position,
   wherein in a case where no external force acts on the engagement member when the engagement member is located in the engaged position, the stopper and the engagement member are separated from each other.

4. The vehicle seat according to claim 1,
wherein the back frame comprises a first side frame and a second side frame positioned separately from each other in a seat width direction,
wherein the engagement member is provided to the first side frame,
wherein a restriction member is provided on an opposite side of the engagement member relative to the first side frame, the restriction member being configured to restrict the engagement member from being displaced in the seat width direction, and
wherein the restriction member is fixed to the first side frame at a plurality of places, and at least one place of the plurality of places is fixed to the first side frame through the stopper.

5. The vehicle seat according to claim 1, further comprising:
an inclined guide surface provided in a portion of the engagement member facing the stopper, the inclined guide surface being configured to, when the engagement member contacts the stopper due to the external force, exert a force on the engagement member to displace the engagement member toward the engaged position.

6. A vehicle seat comprising:
a cushion frame;
a first side frame pivotable on a pivot axis;
a tilting member including an engagement target portion;
an engagement member including an engagement portion and configured to engage with the engagement target portion;
a locking member configured to lock the engagement member onto the tilting member in an engaged configuration;
a stopper, and
a restriction member configured to restrict movement in a width direction of the engagement portion relative to the engagement target portion,
wherein the locking member includes a cam portion and is rotatable about a first coupling pin,
wherein the engagement member includes a sliding contact portion and is rotatable about a second coupling pin,
wherein the locking member and the engagement member are configurable into a locking position, and
wherein, in the locking position, the cam portion of the locking member presses downward on the sliding contact portion of the engagement member, and engages the engagement portion of the engagement member into the engagement target portion of the tilting member.

7. The vehicle seat according to claim 6, further comprising:
a restriction member configured to restrict movement in a width direction of the engagement portion relative to the engagement target portion,
wherein the locking member includes a cam portion and is rotatable about a first coupling pin,
wherein the engagement member includes a sliding contact portion and is rotatable about a second coupling pin,
wherein the locking member and the engagement member are configurable into a locking position,
wherein, in the locking position, the cam portion of the locking member presses downward on the sliding contact portion of the engagement member, and engages the engagement portion of the engagement member into the engagement target portion of the tilting member,
wherein the locking member and the engagement member are further configurable into a non-locking position,
wherein, in the non-locking position, the locking member lifts the engagement member away from the tilting member, and disengages the engagement portion of the engagement member from the engagement target portion of the tilting member,
wherein the engagement member further includes an inclined guide surface configured to, when a rearward external force is applied to the first side frame, contact the stopper and push the engagement member into the tilting member,
wherein the locking member is located between the first side frame and the restriction member,
wherein the engagement member is located between the first side frame and the restriction member, and
wherein the tilting member is located between the first side frame and the restriction member,
wherein the restriction member includes:
a first fixing portion adjacent to the stopper,
a second fixing portion adjacent to the second coupling pin, and
a third fixing portion adjacent to the first coupling pin, wherein the third fixing portion includes a snap ring, and
wherein the restriction member further includes an arm around the pivot axis.

8. The vehicle seat according to 6, wherein the locking member and the engagement member are further configurable into a non-locking position,
wherein, in the non-locking position, the locking member lifts the engagement member away from the tilting member, and disengages the engagement portion of the engagement member from the engagement target portion of the tilting member.

9. The vehicle seat according to claim 6,
wherein the tilting member further includes an abutment portion configured to abut against the stopper when a rearward force is applied to the first side frame.

10. The vehicle seat according to claim 6,
wherein the engagement member further includes an inclined guide surface configured to, when a rearward external force is applied to the first side frame, contact the stopper and push the engagement member into the tilting member.

11. The vehicle seat according to claim 6,
wherein the locking member is located between the first side frame and the restriction member,
wherein the engagement member is located between the first side frame and the restriction member, and
wherein the tilting member is located between the first side frame and the restriction member.

12. The vehicle seat according to claim 11, wherein the restriction member includes:
a first fixing portion a first fixing portion adjacent to the stopper,
a second fixing portion adjacent to the second coupling pin, and
a third fixing portion adjacent to the first coupling pin.

13. The vehicle seat according to claim 12, wherein the third fixing portion includes a snap ring.

14. The vehicle seat according to claim 13, wherein the restriction member further includes an arm around the pivot axis.

15. The vehicle seat according to claim 1,
wherein the pivot center axis of the tilting member is positioned below the pivot center axis of the engagement member.

* * * * *